(12) United States Patent
Razinskas et al.

(10) Patent No.: US 12,210,616 B1
(45) Date of Patent: Jan. 28, 2025

(54) BROWSER-SIDE EXECUTION DETECTION AND PREVENTION

(71) Applicant: 360 IT, UAB, Vilnius (LT)

(72) Inventors: Dainius Razinskas, Vilnius (LT); Mohamed Adly Amer Elgaafary, Vilnius (LT)

(73) Assignee: 360 IT, UAB, Vilnius (LT)

( * ) Notice: Subject to any disclaimer, the term of this patent is extended or adjusted under 35 U.S.C. 154(b) by 0 days.

(21) Appl. No.: 18/744,852

(22) Filed: Jun. 17, 2024

(51) Int. Cl.
*G06F 21/00* (2013.01)
*G06F 21/54* (2013.01)
*G06F 21/55* (2013.01)
*G06F 21/56* (2013.01)

(52) U.S. Cl.
CPC ............ *G06F 21/54* (2013.01); *G06F 21/554* (2013.01); *G06F 21/564* (2013.01)

(58) Field of Classification Search
CPC ....... G06F 21/564; G06F 21/554; G06F 21/54
USPC .......................................................... 726/22
See application file for complete search history.

(56) References Cited

U.S. PATENT DOCUMENTS

| | | | | |
|---|---|---|---|---|
| 2002/0069222 A1* | 6/2002 | McNeely | ............. | G06F 40/174 |
| | | | | 715/205 |
| 2003/0158953 A1* | 8/2003 | Lal | ........................ | H04L 69/40 |
| | | | | 709/218 |
| 2015/0186542 A1* | 7/2015 | Singh | .................. | G06F 16/9566 |
| | | | | 715/206 |
| 2015/0193389 A1* | 7/2015 | Rose | .................... | G06F 16/9558 |
| | | | | 715/208 |
| 2017/0013012 A1* | 1/2017 | Hansen | ................ | G06Q 20/382 |
| 2023/0273990 A1* | 8/2023 | Call | .................... | H04L 63/1441 |
| | | | | 726/23 |

FOREIGN PATENT DOCUMENTS

CN          112597423       *    1/2021     ........... G06F 16/957

* cited by examiner

*Primary Examiner* — Josnel Jeudy
(74) *Attorney, Agent, or Firm* — Young Basile Hanlon & MacFarlane, P.C.

(57) ABSTRACT

Browser-side execution detection and prevention may include identifying, by a client device, a change to an anchor tag in a document object model of a web page; in response to identifying the change to the anchor tag, transmitting, by the client device to a link checking server, a link evaluation request for the anchor tag; receiving, by the client device and from the link checking server, a response indicating a failure of at least one test performed by the link checking server with respect to the anchor tag; and, in response to the response indicating the failure, altering a display of the anchor tag, to obtain an altered anchor tag, in the web page, the altered anchor tag including a visual indicator of the failure.

20 Claims, 12 Drawing Sheets

```
<style>
    .undesirable-link-icon {
        display: inline-block;
        background-image: url('icon.png');
        cursor: help;
    }
    .undesirable-link-icon:hover:after {
        content: attr(data-reason); /* Show the reason on hover */
        position: absolute;
    }
</style>

<script>
document.addEventListener('DOMContentLoaded', function() {
    var anchorTags = document.getElementsByTagName('a');
    for (let i = 0; i < anchorTags.length; i++) {
        evaluateLink(anchorTags[i]);
    } function evaluateLink(anchorTag) {
        var xhr = new XMLHttpRequest();
        xhr.open('POST', 'https://linkChecker.com/api/evaluateLink', true);
        xhr.setRequestHeader('Content-Type', 'application/json');

xhr.onreadystatechange = function() {
            var response = JSON.parse(xhr.responseText);

if (response.status === "UNDESIRABLE LINK") {
                var icon = document.createElement('span');
                icon.className = 'undesirable-link-icon';
                icon.setAttribute('data-reason', response.reason);
                anchorTag.parentNode.insertBefore(icon, anchorTag.nextSibling);
            }
        };

var linkToEvaluate = { url: anchorTag.href };
        xhr.send(JSON.stringify(linkToEvaluate));
    }
});
</script>
```

FIG. 5

```
<script>
  // Mutation observer to listen for changes in the DOM
  const observer = new MutationObserver(mutations => {
    mutations.forEach(mutation => {
      if (mutation.addedNodes.length) {
        mutation.addedNodes.forEach(node => {
          if (node.nodeType === Node.ELEMENT_NODE &&
              node.tagName === 'A') {
            evaluateLink(node); // Call evaluateLink on new anchor tags
          }
        });
      }
    });
  });

// Configuration of the observer:
  const config = { childList: true, subtree: true };

// Start observing the target node for configured mutations
  observer.observe(document.body, config);
</script>
```

FIG. 7

```
func CalculatePosterior(prior float64, events []Event) float64 {
  // Calculate the evidence probability P(E)
  var evidence float64
  for _, event := range events {
    evidence += event.Likelihood * event.Weight
  }

// Calculate the posterior probability P(H|E)
  posteriorNumerator := prior
  for _, event := range events {
    posteriorNumerator *= event.Likelihood
  }
  posterior := posteriorNumerator / evidence return posterior
}
```

```
func PolynomialRegression(data []WeightedValue, degree int) []float64 { n := len(data)

// Construct the Vandermonde matrix
X := mat.NewDense(n, degree+1, nil)
Y := mat.NewDense(n, 1, nil)

for i, point := range data {
  for j := 0; j <= degree; j++ {
    X.Set(i, j, math.Pow(point.X, float64(j)))
  }
  Y.Set(i, 0, point.Y)
}

// Compute X^T * X and X^T * Y
var XT mat.Dense
XT.Mul(X.T(), X)

var XTY mat.Dense
XTY.Mul(X.T(), Y)

// Solve for the coefficients
var coeffs mat.Dense
err := coeffs.Solve(&XT, &XTY)
if err != nil {
  log.Fatalf("Failed to solve linear system: %v", err)
}

// Extract coefficients
c := make([]float64, degree+1)
for i := range c {
  c[i] = coeffs.At(i, 0)
} return c
}
```

FIG. 8B 8500 (CONTINUED)

```
func PolynomialRegression(data []WeightedValue, degree int) []float64 { n := len(data)

// Construct the Vandermonde matrix
X := mat.NewDense(n, degree+1, nil)
Y := mat.NewDense(n, 1, nil)

for i, point := range data {
  for j := 0; j <= degree; j++ {
    X.Set(i, j, math.Pow(point.X, float64(j)))
  }
  Y.Set(i, 0, point.Y)
}

// Compute X^T * X and X^T * Y
var XT mat.Dense
XT.Mul(X.T(), X)

var XTY mat.Dense
XTY.Mul(X.T(), Y)

// Solve for the coefficients
var coeffs mat.Dense
err := coeffs.Solve(&XT, &XTY)
if err != nil {
  log.Fatalf("Failed to solve linear system: %v", err)
}

// Extract coefficients
c := make([]float64, degree+1)
for i := range c {
  c[i] = coeffs.At(i, 0)
} return c
}
```

FIG. 8C

BROWSER-SIDE EXECUTION DETECTION AND PREVENTION

BACKGROUND

Cyber threats leveraging JavaScript, a widely used programming language capable of complex functionalities, are increasingly exploiting vulnerabilities to execute malicious activities, such as Cross-Site Scripting (XSS) and unauthorized data retrieval. Such attacks pose serious risks, potentially leading to significant data breaches, privacy violations, and substantial financial losses for both users and organizations. Given the severity and sophistication of these threats, there is a pressing need for more effective and adaptive security solutions.

SUMMARY

Disclosed herein are one or more examples of implementations of browser-based execution detection and prevention, such as of cyber threats.

A first aspect of the disclosed implementations is a method that includes identifying, by a client device, a change to an anchor tag in a document object model of a web page; in response to identifying the change to the anchor tag, transmitting, by the client device to a link checking server, a link evaluation request for the anchor tag; receiving, by the client device and from the link checking server, a response indicating a failure of at least one test performed by the link checking server with respect to the anchor tag; and, in response to the response indicating the failure, altering a display of the anchor tag, to obtain an altered anchor tag.

A second aspect of the disclosed implementations is a device that includes a memory and a processor. The processor is configured to execute instructions stored in the memory to identify a change to an anchor tag in a document object model of a web page; in response to identifying the change to the anchor tag, transmit, to a link checking server, a link evaluation request for the anchor tag; receive, from the link checking server, a response indicating a failure of at least one test performed by the link checking server with respect to the anchor tag; and, in response to the response indicating the failure, alter a display of the anchor tag, to obtain an altered anchor tag.

A third aspect of the disclosed implementations is a non-transitory computer-readable storage medium that includes executable instructions that, when executed by a processor, facilitate performance of operations that include identifying, by a client device, a change to an anchor tag in a document object model of a web page; in response to identifying the change to the anchor tag, transmitting, by the client device to a link checking server, a link evaluation request for the anchor tag; receiving, by the client device and from the link checking server, a response indicating a failure of at least one test performed by the link checking server with respect to the anchor tag; and, in response to the response indicating the failure, altering a display of the anchor tag, to obtain an altered anchor tag, in the web page.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 illustrates an example of the operations of a link checker.

FIG. 7 illustrates an example of the operations of a Document Object Model (DOM) monitor.

FIG. 8A illustrates an example of calculating a Bayesian Inference.

FIGS. 8B-8C illustrate an example of calculating a Polynomial regression.

DETAILED DESCRIPTION

Figure 1:
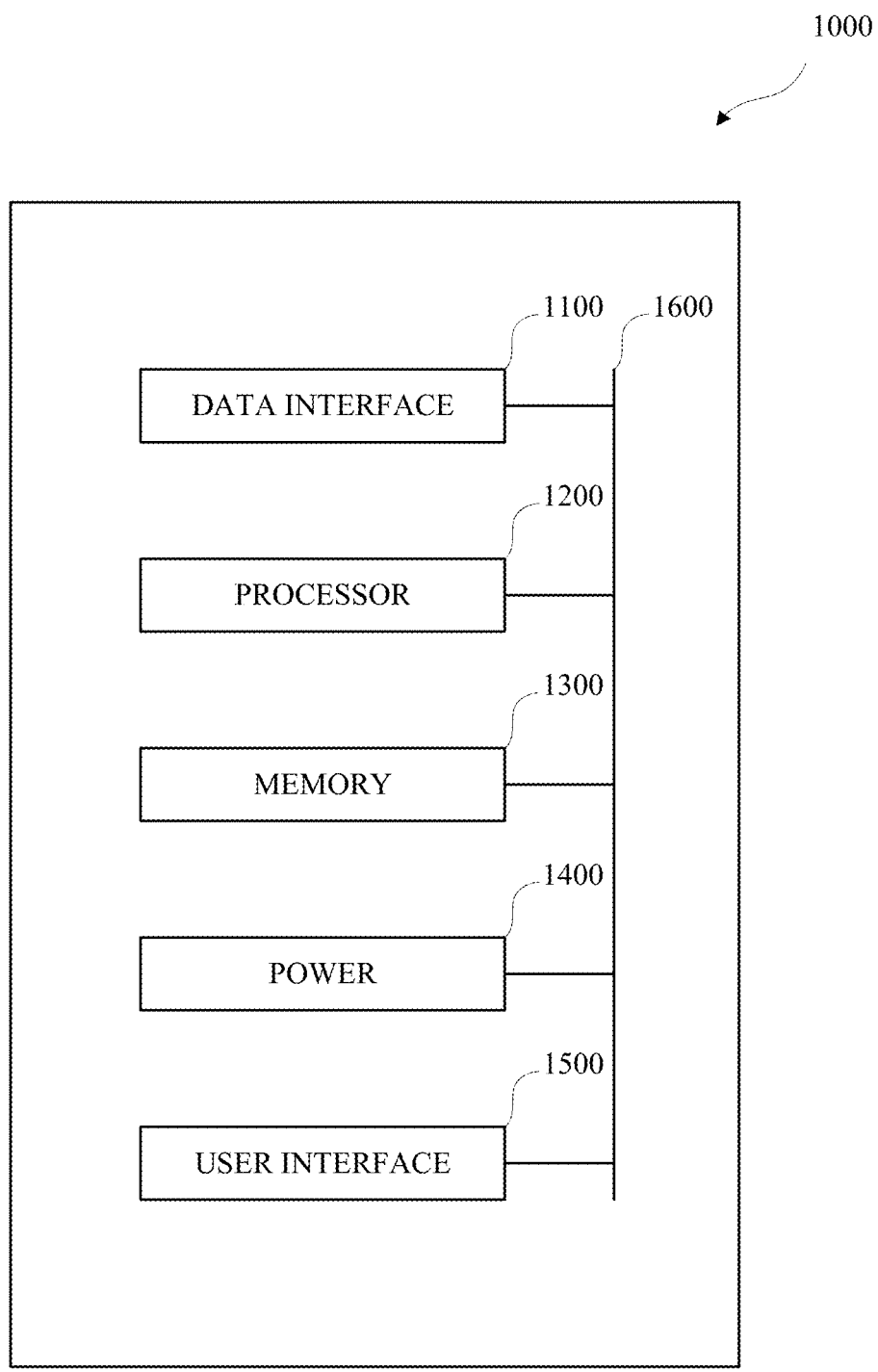
FIG. 1 is a block diagram of an example of a computing device.

Conventional systems designed to detect malicious attacks, such as XSS, or otherwise designed to mitigate undesirable effects at user device (i.e., a client), often operate at the network level, focusing on filtering and blocking harmful traffic before it reaches the user. Such systems may scrutinize incoming and outgoing network packets, apply rulesets to detect patterns indicative of malicious activity, and intercept harmful requests based on predefined security rules or policies. However, these measures predominantly occur outside the user's web browsing environment (e.g., outside of the web browser), limiting their effectiveness to only those threats that can be identified and intercepted at the network layer.

Thus, such conventional network-level security measures fall short as they cannot inspect or mitigate threats embedded within or triggered by dynamic, client-side script (e.g., JavaScript) executions, which are often obfuscated and bypass conventional detection systems. Thus, measures that predominantly occur outside the user's browsing environment, have limited effectiveness to only those threats that can be identified and intercepted at the network layer.

Stated another way, despite the protective intentions behind network-level security mechanisms, they are not without drawbacks. For instance, they are typically incapable of examining content dynamically generated by client-side scripts within a browser, where attacks such as XSS, phishing, cyber mining, among others, often occur. This limitation allows attackers to exploit the gap between when content is generated and when it is displayed to the user, bypassing traditional network security defenses. Moreover, network-level systems may not effectively address zero-day exploits or encrypted traffic that obscures malicious content, leaving users vulnerable to more sophisticated attacks. This limitation arises because these systems often rely on known threat signatures to identify attacks, making them less effective against new, previously unrecorded threats (zero-day exploits) and traffic that is encrypted, which hides the content of communications from conventional detection methods.

Implementations according to this disclosure solve problems such as these by implementing an in-browser solution that actively monitors and controls (e.g., prevents) both static and dynamic content within the browser itself. A client guard engine is designed to enhance browser security and mitigate against undesirable effects by providing real-time monitoring and protection against various types of undesirable effects, such as cyber threats, directly within the client's browser environment.

The client guard engine can be configured with a suite of tools that perform targeted functions aimed at preemptively identifying, analyzing, and mitigating potential undesirable effects. For example, the client guard engine may be configured to scan and evaluate hyperlinks for malicious content, intercept and analyze potentially harmful JavaScript executions, suppress intrusive or malicious advertisements, continuously monitor for Document Object Model (DOM) changes to detect and respond to undesirable alterations, or detect unauthorized cryptocurrency mining activities. The term "execution," as used herein encompasses or includes clicking, such as by a use, on a hyperlink on a web page. The DOM is a programming interface that represents and interacts with the content, structure, and style of web documents as a tree-like structure of objects and nodes, enabling dynamic changes to be made via programming languages, such as JavaScript.

To illustrate, and as further described herein, the client guard engine may directly intercept and analyze certain JavaScript functions that are commonly exploited in XSS attacks such as eval( ) and fetch( ) As another illustration, the client guard engine can be included (e.g., injected) in the main pages of web-based email clients, where users are frequently targeted by phishing attacks. Phishing is a type of cyberattack where attackers deceive users into providing sensitive data or accessing malicious websites by masquerading as a trustworthy entity in electronic communications.

By embedding the client guard engine (e.g., the security measures, heuristic analysis, or preemptive scanning capabilities thereof) within the client's web browser, the client guard engine can preemptively identify and neutralize undesirable effects (e.g., threats) before they compromise the user's client and cause harm. Having a control over the DOM and JavaScript code executing therein affords several protective elements to the user, including, but not limited to, preemptively preventing users from navigating to malicious links, thereby safeguarding against deceptive or harmful web resources; blocking the execution of malicious JavaScript code, offering a robust defense mechanism independent of server-side protections, such as Content Security Policy (CSP); effectively thwarting XSS attacks, providing a critical security layer that remains active regardless of the server's security configuration; and preventing the download of "download bombs" that could overwhelm the client. A download bomb is a cyberattack that overwhelms a client by triggering a massive number of downloads simultaneously, often without consent, which can crash the browser or client, disrupt activities, or exploit vulnerabilities for further attacks.

With respect to zero-day exploits, once a prediction of maliciousness is made, subsequent users of the malicious website or script can be protected. As further described herein, the prediction of maliciousness can be made based on heuristic analysis and machine learning algorithms. As described herein, the prediction may involve identifying patterns or behaviors indicative of malicious intent, such as unauthorized data access, script injections, or other forms of cyberattacks. Once such malicious behavior is predicted or detected, measures are taken to protect subsequent users from the identified threat.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 is a stationary device, such as a personal computer (PC), a server, a workstation, a minicomputer, or a mainframe computer. In some implementations, the computing device 1000 is a mobile device, such as a mobile telephone, a personal digital assistant (PDA), a laptop, or a tablet computer.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 1100 may include, or may be, a transceiver. Although not shown separately in FIG. 1, the data interface 1100 may include, or may be operatively coupled with, an antenna for wireless electronic communication. Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1, the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communications links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available, information, such as to an operator of the computing device 1000, such as a human user.

The user interface 1500 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 shown in FIG. 1 may be omitted, or absent, from the computing device 1000 or may be combined or integrated. For example, the memory 1300, or a portion thereof, and the processor 1200 may be combined, such as by using a system on a chip design.

Figure 2:
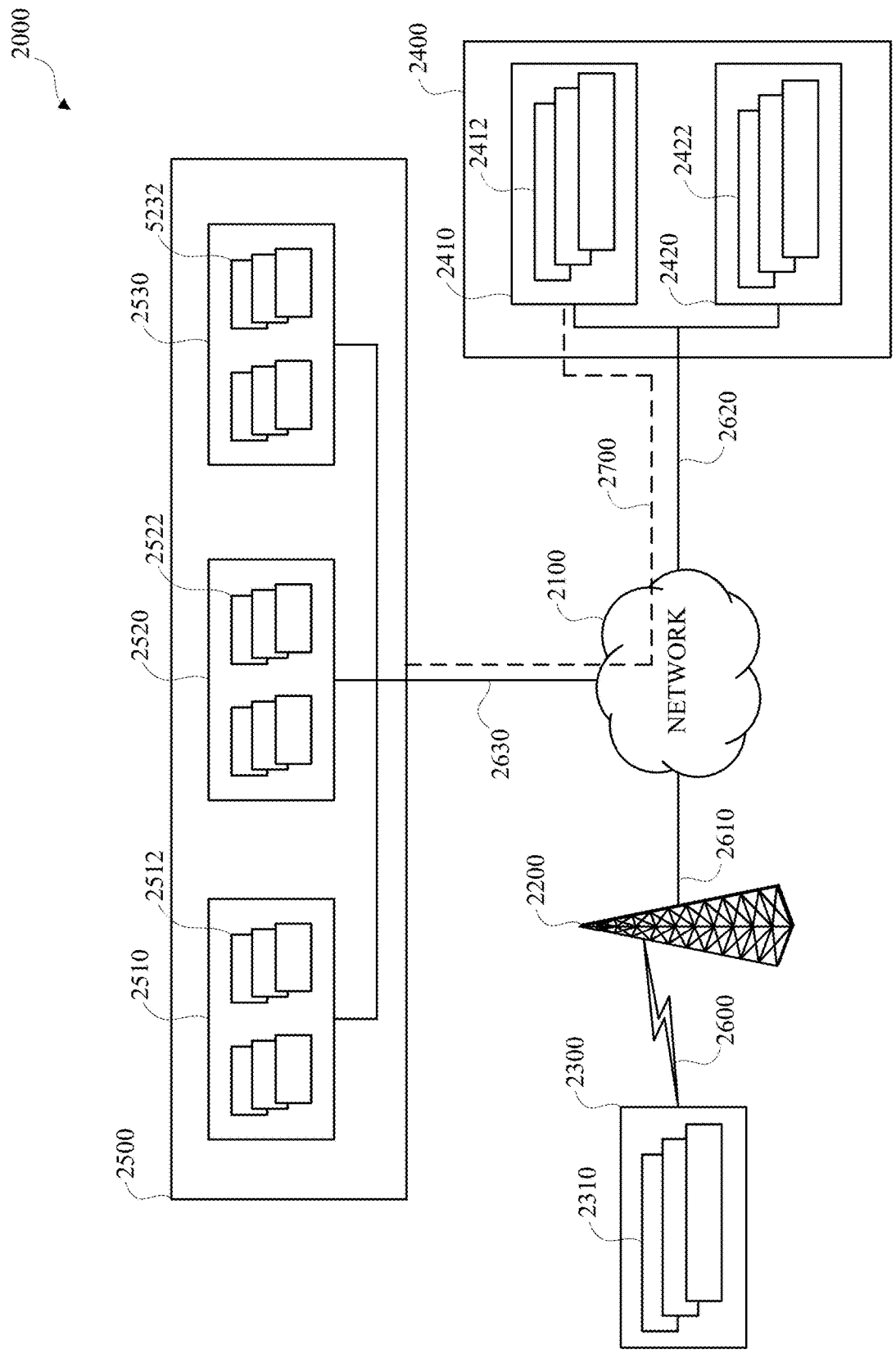
FIG. 2 is a block diagram of an example of a computing and communications system.

FIG. 2 is a diagram of an example of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

One or more of the networks 2100, 2400, 2500 may be, or may include, a local area network (LAN), wide area network (WAN), virtual private network (VPN), a mobile or cellular telephone network, the Internet, or any other means of electronic communication. The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 2100, 2400, 2500, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links.

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620. Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2520 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520, 2530 respectively using one or more of the networks 2100, 2400, 2500, which may include communicating using the access point 2200, via one or more of the communications links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2520, via the first communications link 2600, the access point 2200, the second communications link 2610, the network 2100, the fourth communications link 2630, and the third network 2500.

For simplicity and clarity, the sequence of communications links, access points, networks, and other communications devices between a sending communicating device and a receiving communicating device may be referred to herein as a communications path. For example, the first computing and communications device 2300 may send data to the second computing and communications device 2410 via a first communications path, or via a combination of communications paths including the first communications path, and the second computing and communications device 2410 may send data to the first computing and communications device 2300 via the first communications path, via a second communications path, or via a combination of communications paths, which may include the first communications path.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network. For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 2620, and the fourth communications link 2630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2520 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2520 may, respectively, be virtual devices operating on shared physical resources.

Figure 3:
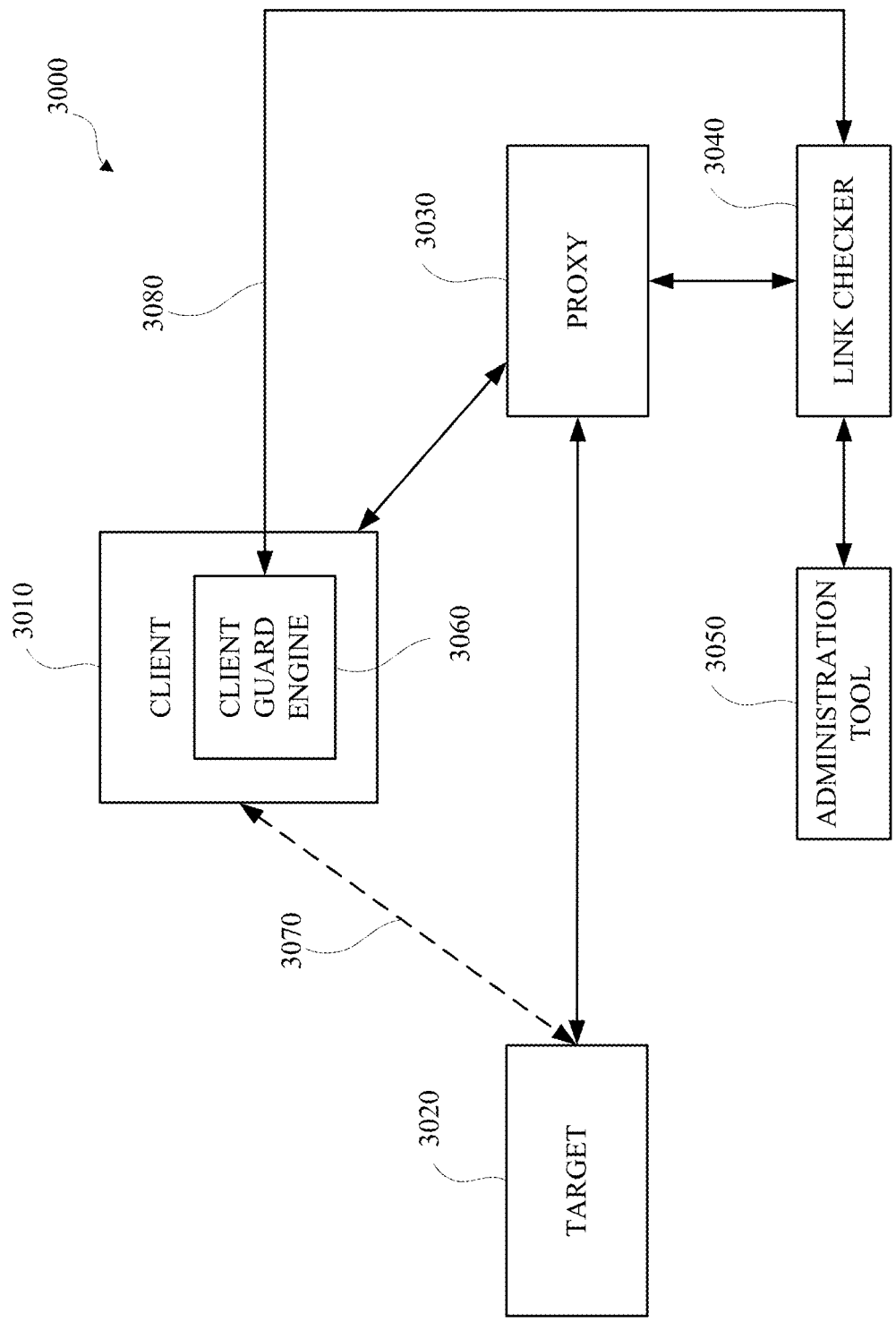
FIG. 3 is a block diagram of a system for browser-side execution detection and prevention.

FIG. 3 is a block diagram of a system 3000 for browser-side execution detection and prevention. The system 3000 includes a client 3010, a target 3020, a proxy 3030, a link checker 3040, and an administrative tool 3050, each of which may be generically referred to as a system constituent. At least the client 3010, the target 3020, and the proxy 3030 are communicatively connected.

A system constituent refers to one or both of a device or an application. Where a system constituent is or refers to a device, the component can comprise a computing system, which can include one or more computing devices (e.g., one or more of the computing device 1000 of FIG. 1). Where a system constituent instead is or refers to an application, the component can be an instance of software running on a device (e.g., a computing device). In some implementations, a system constituent can be implemented as a single physical unit or as a combination of physical units. In some implementations, a single physical unit can include multiple components.

The client 3010 can be a client device, such as the first computing and communications device 2300 shown in FIG. 2, or a system that includes a client device. The target 3020 can be a server device, such as the second computing and communications device 2410 or the third computing and communications device 2420 shown in FIG. 2, or a system that includes one or more server devices. In a typical interaction, the client 3010 may transmit a request to the target 3020 to retrieve content, for the target 3020 to perform an action, or the like. Requests transmitted by the client 3010 are indicated with a dashed line 3070 to illustrate that the requests are intercepted by the proxy 3030 prior to transmission to the target 3020. The target 3020 processes the request and transmits content back to the client 3010 via the proxy 3030.

The client 3010 may be configured to use the proxy 3030. For the client 3010 to use the proxy 3030, the client 3010 may be configured with proxy settings (e.g., an internet protocol (IP) address, a port number, or the like) of the proxy 3030. In an example, network settings included or associated with the client 3010 may include the proxy settings. In an example, the proxy settings may be configured in the client application itself. The client 3010 may be a web browser and configuration the proxy settings may be possible via the client 3010. In another example, the client 3010 may be automatically configured, such as via an automatic configuration script or protocol (such as Web Proxy Auto-Discovery Protocol (WPAD)) to discover and apply the proxy settings automatically.

The proxy 3030 can be any type of intermediary between the client 3010 and the target 3020 that is capable of intercepting requests from the client 3010 and identifying requests that are initiated by the client guard engine 3060. The proxy 3030 may also inject the client guard engine 3060 into a response transmitted from the target 3020 to the client 3010. The proxy 3030 can be a web browser extension. The proxy 3030 can be an HTTP proxy implemented at (e.g., deployed at and executing at) the client 3010. The proxy 3030 can be a remote forward proxy located within or outside the network of the client 3010. The proxy 3030 may simultaneously (e.g., concurrently) act as an intermediary between one or more clients and one or more corresponding targets.

The client 3010 may transmit, or may be configured to transmit, requests to the target 3020 through the proxy 3030. As such, requests initiating from the client 3010 to the target 3020 can be routed through the proxy 3030. With respect to some requests, the proxy 3030 may forward these requests to the target 3020 on behalf of the client 3010. When the target 3020 responds, the proxy 3030 receives the response (e.g., the data of the response) first, may modify and/or inspect the data, and forwards the data (modified or otherwise) to the client 3010. With respect to other requests, the proxy 3030 may itself process such requests without forwarding them to the target 3020. With respect to at least certain responses, the proxy 3030 may modify the request by injecting (e.g., adding) a client guard engine 3060 into the response. The response is said to be "augmented" with the client guard engine 3060.

The proxy 3030 can have the capacity to inspect and modify HTTP secure (HTTPS) payloads in TLS connections such that the proxy 3030 is capable of handling plain HTTP and HTTPS data. In such cases where the requests from the client 3010 are transmitted over a secure protocol, such as those encrypted with, for example, HTTPS, the proxy 3030 can be configured to perform SSL/TLS interception (e.g., decryption and re-encryption), such as to inspect or modify the content. To implement TLS interception, the proxy 3030 is configured to establish a certificate trust with the client 3010. This can involve the client 3010 trusting a self-signed certificate authority created by the proxy 3030 or recognizing pre-generated certificates for specific websites. Such certificates can be included in certificate authorities (not shown) of the system 3000 or a certificate store (not shown) of the client 3010.

With the trusted certificates in place, the proxy 3030 can initiate separate TLS sessions with the client 3010 and the target 3020. This allows the proxy 3030 to decrypt, inspect, and modify HTTPS data that is usually encrypted. To direct the requests from the client 3010 (e.g., to direct web browser traffic) through the proxy 3030, network settings can be adjusted on the operating system of the client 3010 or the client 3010 itself (e.g., web browser), or low-level network interception techniques, such as kernel modules or firewall rules, can be utilized.

The proxy 3030 acts as an intermediary that decrypts incoming encrypted data from the client 3010, inspects or augments the data as necessary, and then re-encrypts the data before sending it to the target 3020. This process starts with the proxy 3030 accepting a TCP connection from the client 3010 (e.g., from a web browser) and performing a TLS handshake using a certificate trusted by the client 3010. After establishing the connection to the target 3020 that the client 3010 intended to reach and ensuring that the TLS handshakes on both ends are successful and the certificates are validated, the communication proceeds through the encrypted tunnels. The response from the target 3020 undergoes a similar process in reverse: the proxy 3030 decrypts the data received from the target 3020, inspects or modifies the data, and re-encrypts the data before transmitting it to the client 3010.

Responses that the proxy 3030 modifies or augments to add the client guard engine 3060 typically include those where the primary content type is HTML, such as those representing a "main page" of a website (e.g., an email web-site service). "Main page" refers to an initial document loaded by the browser when a user navigates to a base Uniform Resource Locator (URL) of a website or follows a link intended for primary content display, as opposed to secondary resources such as images, cascading style sheets (CSS), or inline frames (iframes). A main page can be the foundational Hypertext Markup Language (HTML) document that defines the core structure of a website's interface to which additional resources are linked or dynamically loaded.

This main page can be augmented to ensure that the client guard engine 3060 can function effectively by monitoring and controlling the DOM of the webpage. That is, the client guard engine 3060 becomes an active part of the webpage's environment and can start its monitoring and security functions upon page rendering. As mentioned, other responses that may not be augmented with the client guard engine 3060 include those associated with sub-resource requests, such as images, CSS files, or dynamically loaded content (such as via Asynchronous JavaScript and XML (AJAX) requests that are made after the initial page load and do not directly affect the overall page structure where the client guard engine 3060 operates).

The client guard engine 3060 can be considered to be a JavaScript virtual machine injected into the client's browser to monitor, analyze, and secure the execution of JavaScript code in real-time and to monitor DOM changes. The client guard engine 3060 preemptively identifies and neutralizes malicious scripts and dynamic DOM changes that could lead to security breaches. The client guard engine 3060 can employ heuristic analysis to evaluate script behavior, blocks unwanted network requests, and provides visual indicators to the user for potentially dangerous links. Aspects of the client guard engine 3060 are further described with respect to FIGS. 4-8C.

The link checker 3040 can be configured for evaluating hyperlinks, such as those present in a DOM for potential undesirable effects (e.g., such as security threats). The link checker 3040 may receive a request to evaluate (e.g., "a link evaluation request") one or more URLs. The request may include aspects such as the URL itself and metadata associated with the URL such as tags and attributes within the DOM. The client guard engine 3060 may directly issue requests to the link checker 3040 (as illustrated by an arrow 3080), or may route such requests through the proxy 3030, which then communicates with the link checker 3040 (e.g., transmits the link evaluation requests). The link checker may use or include a continuously updated set of known undesirable (e.g., malicious) URLs to assess the safety of links, enabling real-time protection against undesirable effects at the client 3010, such as phishing, malware distribution, cyber threats, cyber mining, and/or other undesirable effects. The set of known undesirable URLs can include actual URLs or URL patterns. For example, the link checker 3040 may include patterns of insidious malware strains, phishing schemes, and the like.

When a link evaluation request with respect to a URL is received, the link checker 3040 may cross-reference the URL included in the request against the database of known undesirable URLs. If the URL is found in the database, the link checker 3040 may mark it as unsafe and may send a response to the client guard engine 3060 indicating such, along with reasons for the URL being flagged. A URL received in a link evaluation request is found in the database if the URL matches a URL that is in the database or matches a pattern that is in the database. With respect to a URL, the link checker 3040 may perform analyses such as heuristic evaluation or reputation scoring based on factors like domain age, historical content, and known associations with malicious activity. Following this analysis, the link checker 3040 may either mark the URL as safe or flag the URL.

The link checker 3040 may, in response to a request from the proxy 3030, inject the client guard engine 3060 into a response transmitted to the client 3010, index JavaScript functions, amend page data by responding to requests from the client 3010, and/or make predictions regarding maliciousness of certain page elements.

The administration tool 3050 may provide user interface usable, such as by a privileged user, to maintain the database of malicious URLs used by the link checker 3040. The administration tool 3050 can enable the addition, removal, and modification of entries in the malicious URLs database to ensure up-to-date protection.

Figure 4:
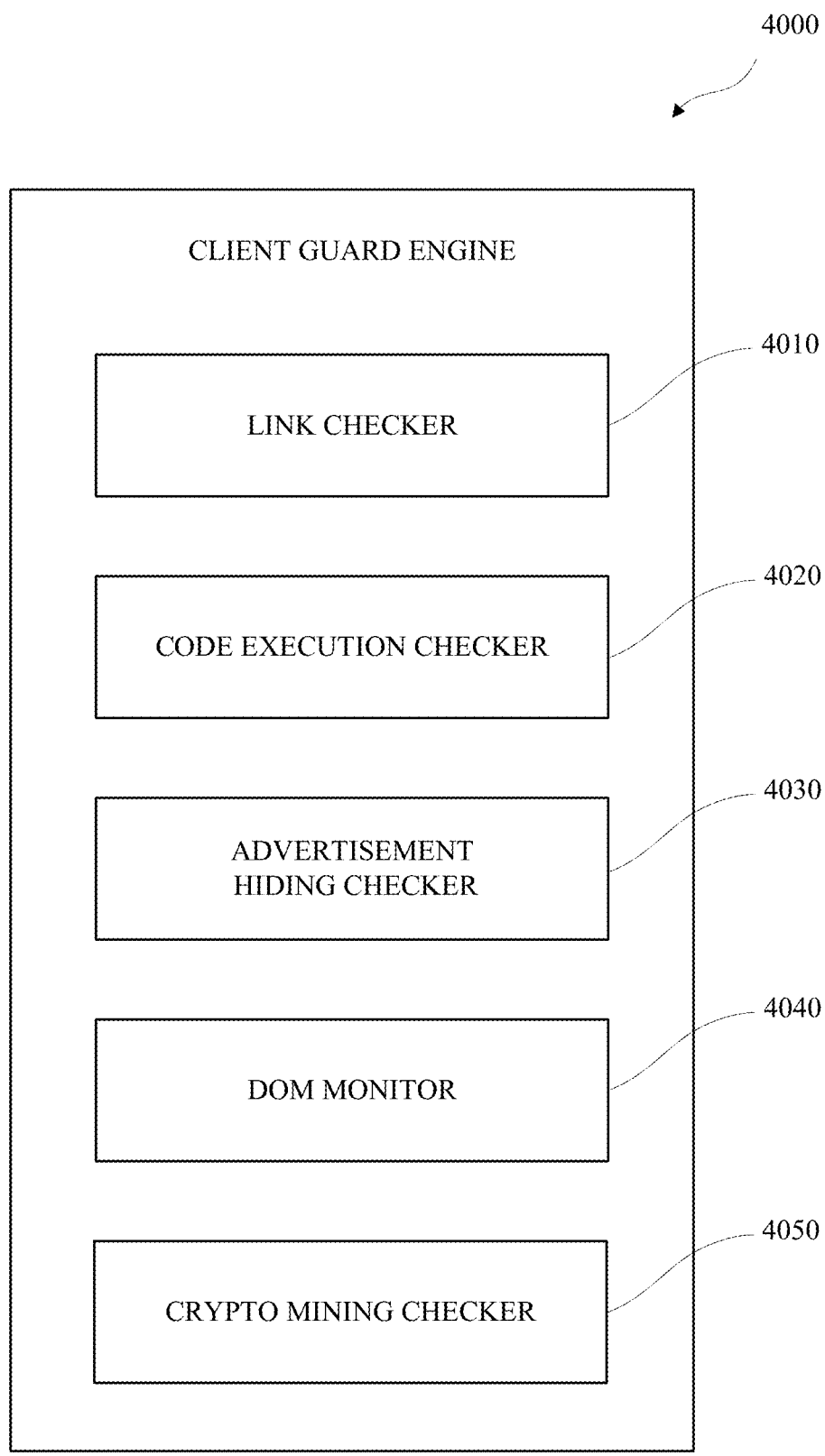
FIG. 4 is a block diagram of an example of functionality of a client guard engine, such as the client guard engine shown in FIG. 3.

FIG. 4 is a block diagram of an example of functionality of a client guard engine 4000, such as the client guard engine 3060 shown in FIG. 3. The client guard engine 4000 includes tools, such as programs, subprograms, functions, routines, subroutines, operations, and/or the like for mitigating undesirable activities, such as to enhance browser security. As shown, the client guard engine 4000 includes a link checker 4010, a code execution checker 4020, an advertisement hiding checker 4030, a DOM monitor 4040, and a crypto mining checker 4050. The client guard engine 4000 may include more, fewer, or other checkers than those shown herein.

The link checker 4010 is configured to preemptively scan and assess hyperlinks within the DOM of a web page to identify and flag undesirable hyperlinks (such as those posing potential cyber security threats) before such links can be activated by user interaction. The link checker 4010 traverses the DOM to identify hyperlinks. The link checker 4010 may issue one or more link evaluation requests to a server-based link checker, such as the link checker 3040 of FIG. 3. FIG. 5 illustrates an example of the operations of the link checker 4010.

If the link checker 4010 receives a response indicating that a hyperlink is undesirable, then the link checker 4010 may be configured to take action to alert the user within the webpage's context. To illustrate, the link checker 4010 may add a visual indicator, such as a flag icon, next to the link as rendered on the page. The icon can be tailored to represent the level of undesirability of the hyperlink, providing an intuitive visual cue about the potential risk. That is, different icons may be used for different levels of undesirability identified by the link checker. Furthermore, when the user hovers over this icon, a tooltip or similar informational display is presented, providing details regarding the reasons why the hyperlink was flagged. The reason may be received from the link checker 3040. Other ways of alerting the user to an undesirable hyperlink are possible. For example, the link checker 4010 may modify the text color or font of undesirable links to make them immediately noticeable or may overlay the hyperlink with a warning text or symbol directly in the webpage.

As such, the user is well-informed about the risks associated with following such links, enhancing overall web security. For example, the user may nevertheless click the link despite the warning. In an example, the proxy 3030 may capture the request and direct the user to a warning page. The warning page can present the user with different options, such as proceeding with caution to the potentially harmful link, returning to safety, or reporting the flag as a false positive if they believe the link has been incorrectly marked. Such an intervention by the proxy 3030 ensures that the user is fully informed and consciously makes the decision to proceed, mitigating inadvertent navigation to harmful sites. Thus, via the warning page, the system 3000 of FIG. 3 adds a user-centric, interactive layer of protection to preemptive capabilities of the client guard engine 4000.

The link checker 4010 may be configured to maintain (e.g., store) a list of hyperlinks found in the DOM and that have already been evaluated, ensuring efficiency and reducing redundancy by issuing link evaluation requests solely for newly identified hyperlinks within the DOM that have not been previously scanned. Newly identified hyperlinks are hyperlinks added to the DOM since a last scan of the DOM by the link checker 4010. This dynamic updating process allows for the real-time addition of new links to the evaluation queue, thereby keeping the user protected as the content of the webpage evolves during browsing sessions.

Figure 6:
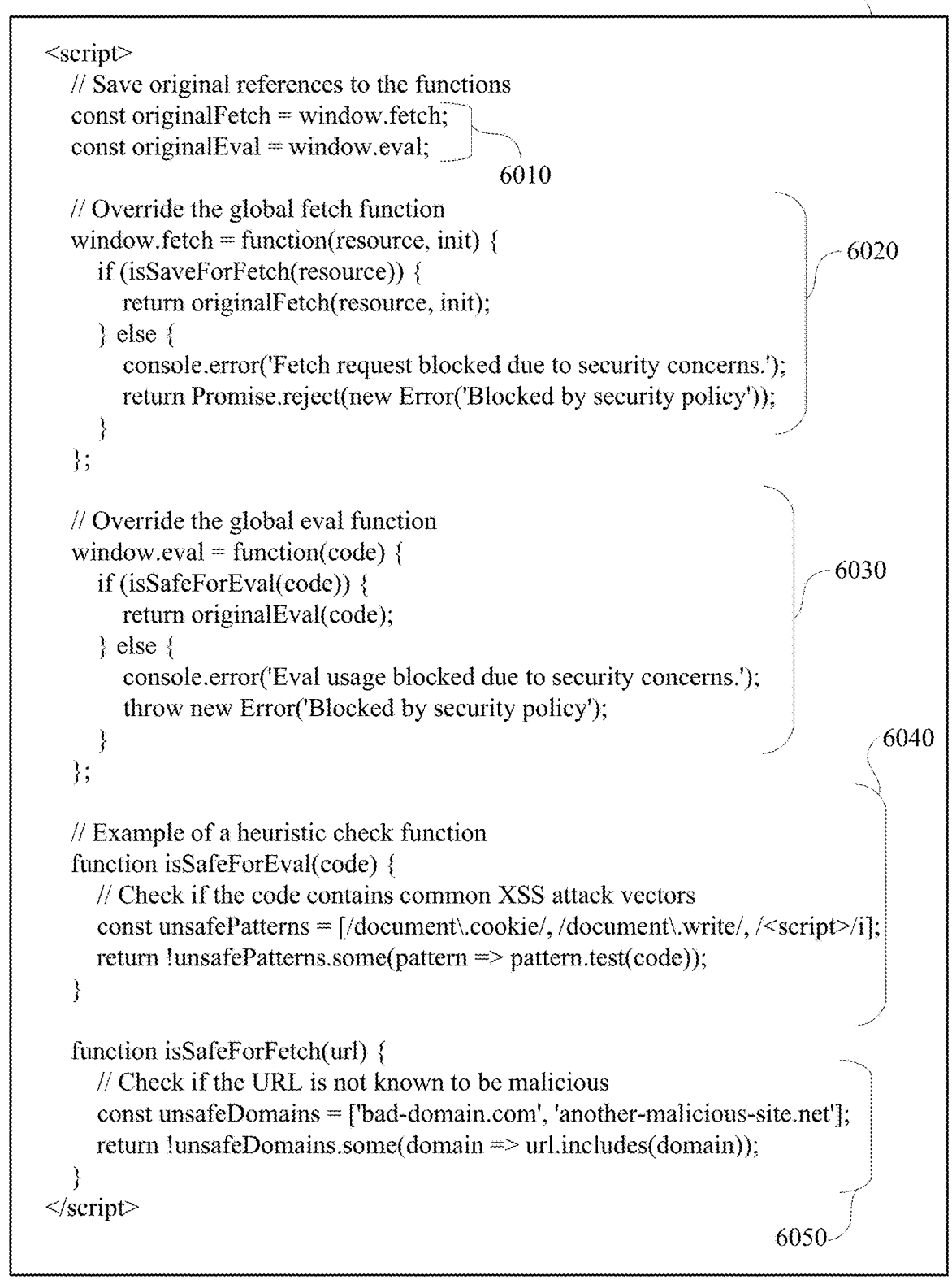
FIG. 6 illustrates an example of the operations of a code execution checker.

The code execution checker 4020 can be configured to intercept and analyze certain JavaScript function calls that have the potential to execute undesirable, often malicious, code within a webpage. For example, the code execution checker 4020 may be configured to target and scrutinize the usage of certain JavaScript functions, such as like eval( ) and fetch( ) which can be exploited for executing XSS attacks or for fetching and executing code from untrusted sources. FIG. 6 illustrates an example of the operations of the code execution checker 4020.

The code execution checker 4020 operates in a manner analogous to a virtual machine, in that it creates a controlled execution environment within the web browser for certain JavaScript function calls. By intercepting function calls and redirecting them through its own evaluation mechanisms, the code execution checker 4020 effectively 'virtualizes' these calls, akin to how a virtual machine provides a controlled environment for executing applications. Via this virtualization, the code execution checker 4020 is configured to determine, in real-time, whether an invocation of a monitored function is to proceed thereby providing a robust security layer against the execution of untrusted code.

To determine whether a function call should proceed or be stopped, the code execution checker 4020 employs heuristic analysis. Heuristic analysis may involve examining various attributes of the call, such as the arguments passed to the function, the context in which the call is made, the script's origin, and the behavior of the call within the execution environment. If the heuristic analysis identifies patterns or behaviors indicative of undesirable effects (e.g., malicious intent), such as attempting to access certain global objects or properties in an unusual manner, the code execution checker 4020 can halt the execution of the call to prevent potential security breaches.

Heuristics analysis may be performed to determine the likelihood that a pattern (e.g., a pattern of execution or a pattern of a function arguments) fits one or more of a set of attacks. In an example, the set of attacks monitored for can include the known JavaScript attacks of XSS, Cross-Site Request Forgery, Auto Download or Drive-by Download, Form Hijacking, Clickjacking, Session Hijacking, Keylogging, and Defacement. However, other attacks are possible.

Events occurring in the DOM of a webpage, such as modifications caused by JavaScript functions, are captured. These captured events are analyzed against heuristics. The captured events are analyzed by the code execution checker 4020. While not specifically shown herein, the heuristics analysis may be performed in whole or in part at a server that is separate and remote from the client device. For example, the link checker 3040 may additionally be configured perform the heuristics analysis. As such, captured events may be transmitted by the code execution checker 4020 to the remote heuristics analysis component.

The captured events are processed to create traces and assign weights. The weights can be based on the degree of danger or maliciousness of an event, determined by how closely the event matches known JavaScript attack patterns. For example, function arguments may be matched (such as based on regular expression matching) against suspected or known attack patterns. Traces represent the sequence of functions and actions leading to a specific event in the DOM. Weighted events are events assigned a numerical value indicating their significance or potential danger. For example, in the case of XSS, the modification of a DOM element by JavaScript functions can be recorded (e.g., captured). The events are grouped and evaluated based on their weights to predict potential malicious activity.

To identify these attacks, the code execution checker 4020 may listen for (e.g., capture or intercept) JavaScript function calls by creating a "function proxy" for functions known to be used with malicious intent. In a simple implementation, the proxy function may be as follows:

```
Function Proxy
const proxyFunction = new Proxy(originalFunction, handler);
const handler = {
   apply: function(target, thisArg, argumentsList)
      const result = target.apply(thisArg, argumentsList);
      // Additional processing
   }
};
```

The proxyFunction acts as proxy for an originalFunction. This proxy intercepts calls to originalFunction and allows custom behavior defined in the handler object. The handler object is defined with an apply( ) method, which is a trap for function calls. The apply( ) method takes three arguments: target corresponding to the original function (originalFunction) being proxied; thisArg, which is the value of object "this" provided for the call to the function; and argumentsList, which is an array-like object of arguments passed to the function. Function interception is accomplished as follows.

The original function (originalFunction) is called using target.apply(thisArg, argumentsList). The result of this call is stored in result. Additional processing can be performed after the original function is called (indicated by the comment //Additional processing). In essence, this code wraps an existing function with additional behavior while still preserving the original functionality. The proxy intercepts calls to the function, executes the original function, and then allows for further actions to be taken based on the result or other conditions. For example, a stack trace of the originalFunction function call can be generated. The stack trace and arguments passed to the originalFunction can be evaluated against the heuristics. In an example, the handler allows the originalFunction to proceed.

Traces or weighted events can be created based on the captured events. To illustrate, events triggered by user interactions, such as clicks, are traced back to their origin to determine the source script responsible for the action. The proxy function and handler setup can be used to monitor and log these events without interfering with the actual execution of the scripts. Users can be protected from malicious activity by predicting and flagging malicious behavior before it can cause harm.

A trace can be or include a detailed record of what happened during the event; and weighted events are events that have been assigned a numerical value (weight) representing their significance or severity. In an example, the weighted events can undergo two algorithms for prediction: a regression analysis and a Bayesian Inference. The regression analysis can be used to analyze the weighted events. This analysis helps in identifying outliers or anomalies, which are indicative of malicious behavior. The Bayesian inference can be employed as a safeguard to ensure that the results of the regression are not biased. Events can be constantly monitored, and the prediction of maliciousness updated. That is, events over time are accumulated to build a comprehensive understanding of the behavior of the webpage. Once a certain threshold of suspicious activity is reached, the URL or script can be flagged by the code execution checker 4020 as malicious.

For instance, when a script attempts to modify the DOM using innerHTML, this event is captured, logged, and assigned a weight based on its potential risk (e.g., based on the heuristics analysis). The event is evaluated in the context of the overall behavior of the webpage. If multiple events indicate suspicious behavior, malicious activity can be predicted, and appropriate action taken. For example, based on a user setting, if a maximum-security setting is configured by or for the user, the most severe prediction will be chosen; if a moderate security setting is configured, the average of the a certain number of predictions (e.g., 2 predictions) may be used; otherwise, a normal security setting causes the lowest prediction to be selected. The result of the inspection can be associated with the source of the script and incorporated into later processing.

It is noted that the first user to encounter a malicious script may not be fully protected until a behavior is identified and classified as malicious. However, once a behavior is predicted to be malicious, the event and its associated characteristics, such as the stack trace, the function calls, and the arguments involved can be logged. This logged information can be stored in a centralized database or server, which is accessible by the client guard engine 4000. Heuristics and threat detection algorithms can be updated based on this newly identified malicious behavior. By doing so, the ability to recognize similar malicious patterns in future interactions can be enhanced over time. When other users encounter a script or behavior that matches the logged malicious pattern, a script can be proactively blocked, warnings issued, or other protective measures taken to prevent harm.

FIG. 8A illustrates an example 8000 of calculating a Bayesian Inference. The Bayesian inference calculates the posterior probability that a certain behavior or script execution within a web browser is malicious based on prior knowledge and captured events. This can be achieved by collecting various events and their associated likelihoods and weights based on observed behaviors in the browser and using Bayesian inference to combine prior knowledge (initial suspicion or belief) with the new evidence (captured events) to update the belief about the script's maliciousness.

The example 8000, which generates the Bayesian inference, is to evaluate the probability that a certain behavior or script execution within a web browser is malicious based on both prior knowledge and newly captured events. The Event data structure represents individual events, each with a likelihood of occurrence given the hypothesis (e.g., the script is malicious) and a weight that reflects the significance of the evidence. The CalculatePosterior( ) function computes the posterior probability, which updates the initial belief (prior probability) about the maliciousness of a script by incorporating new evidence from the captured events. The function first calculates the overall evidence probability by summing the weighted likelihoods of the events. The function then updates the posterior probability by multiplying the prior probability by each event's likelihood and dividing by the evidence probability. As such, the example 8000 dynamically assesses and predicts the likelihood of malicious activities, thereby enhancing the ability to detect and prevent security threats in real-time.

FIGS. 8B-8C illustrate an example 8500 of calculating a Polynomial regression. The example 8500 models the relationship between input data points and predict future values based on this relationship. The PolynomialRegression function constructs a polynomial model of a specified degree that fits the provided data points. This is achieved by first constructing a Vandermonde matrix, which is used to represent the input data in terms of polynomial terms. The function then computes the coefficients of the polynomial by solving the linear system derived from the input data matrix. These coefficients are then used to predict future values using the Predict function, which calculates the predicted value for a given input by evaluating the polynomial. Additionally, the DetectOutliers function identifies data points that deviate significantly from the predicted values, based on a specified threshold. By applying this polynomial regression, patterns in data can be analyzed, predictions made, and anomalies detected, thereby enhancing its ability to interpret and respond to dynamic behaviors and potential security threats in the web browser environment.

The code execution checker 4020 is not limited to monitoring executions of eval( ) and fetch( ) There are other JavaScript functions and methods that the code execution checker 4020 can be configured to monitor due to their ability to introduce undesirable code into a web page. These include, but are not limited to, setTimeout( ) and setInterval( ) when they are used with a string argument, direct assignments to the innerHTML, property of DOM elements, which can lead to the execution of arbitrary HTML and JavaScript if not properly sanitized. The document.write( ) function, which can rewrite the content of a document, is another example of a function that may be trapped by the code execution checker 4020. Furthermore, data fetched via an XML HttpRequest object instance may lead to XSS, such as fetched data that includes user-generated content and is rendered without escaping. As such, the code execution checker 4020 may also monitor the execution of these functions. More generically, the code execution checker 4020 can be configured to monitor the execution functions that retrieve resources asynchronously across a network from an input destination, such as the fetch( ) function; and the code execution checker 4020 can be configured to monitor functions that evaluate and execute an input string, such as the eval( ) function.

The advertisement hiding checker 4030 operates to identify and suppress unwanted advertisements, enhancing the user experience by removing intrusive and potentially harmful advertisement-related content, which may also serve as a conduit for malware in addition to being intrusive. The advertisement hiding checker 4030 may be configured to utilize regular expressions (regex) to efficiently detect URLs or HTML elements that are characteristic of advertising content. Once an ad-related URL or element is identified, such as through pattern matching, the advertisement hiding checker 4030 may be configured to take action to either remove these elements from the DOM or prevent them from loading in the user's browser. This not only cleans up the page, making it easier to navigate and read but also improves page load times and reduces bandwidth consumption.

The DOM monitor 4040 is configured to continuously observe changes within the DOM of a webpage. The DOM monitor 4040 activates upon detecting any alterations to the DOM, such as the addition or modification of elements, which could potentially introduce undesirable effects (e.g., security vulnerabilities or execution of malicious scripts). FIG. 7 illustrates an example of the operations of the DOM monitor 4040.

By dynamically scanning the DOM for these changes, the DOM monitor 4040 ensures that any newly added or altered elements can be evaluated (such as for security threats). This real-time monitoring can prevent exploits that leverage dynamic content, such as XSS attacks, which rely on the ability to inject or modify HTML content on a webpage. For example, in response to detecting changes in the DOM, the DOM monitor 4040 may invoke the link checker 4010, which in turn will scan and assess added or modified hyperlinks.

The crypto mining checker 4050 is configured to detect and prevent unauthorized crypto mining activities, thus protecting the resources of the user's client (e.g., the client 3010 of FIG. 3) from being exploited by hidden mining scripts. The crypto mining checker 4050 operates by monitoring the execution of JavaScript on websites, to identify patterns typical of mining, such as high CPU usage over extended periods or JavaScript that matches known mining signatures. The crypto mining checker 4050 may also analyze WebSocket traffic and Application Programmers Interface (API) calls that are common in web-based mining operations. When potential crypto mining activity is detected, the crypto mining checker 4050 can take actions such as terminating the offending script or alerting the user, thereby safeguarding the user's system resources and enhancing overall client security.

Crypto mining refers to the process by which new digital currency coins are created and transactions are verified on a blockchain network. The process is computationally intensive as it involves solving complex cryptographic puzzles. In the context of web security, unauthorized crypto mining (also referred to as "cryptojacking") occurs when malicious scripts are run on a user's device without their consent, using the device's processing power to mine cryptocurrency. This can lead to reduced performance, increased energy consumption, and shortened hardware lifespan.

FIG. 5 illustrates an example 5000 of the operations of the link checker 4010 of FIG. 4. The example 5000 illustrates JavaScript code that may be injected, such as by the proxy 3030, into a main page, as described above. The example 5000 is a mere simplified, illustrative example and the disclosure herein is not limited to or by the example 5000. The JavaScript of the example 5000 will execute when the DOM of the page is fully loaded. The code then loops through each anchor (e.g., <a>) element and sends an evaluation request to linkChecker.com. If the link is returned as "UNDESIRABLE LINK", it adds an icon next to the link, and hovering over the icon shows the reason why the link was flagged.

Styles 5010 define the appearance and behavior of the visual indicator for undesirable links. The .undesirable-link-icon class gives the icon a consistent inline display and specifies the icon image that visually represents a flagged (e.g., undesirable) link. The :hover:after pseudo-element defines a tooltip-like feature that appears when the user hovers over the icon, providing an explanation for the flagging of the hyperlink. At a line 5020, an addEventListener( ) function attached to the document object serves to execute the enclosed function once the entire DOM has been fully loaded and parsed by the web browser. This ensures that the script operates on a complete HTML structure.

A block 5030 defines an evaluateLink( ) function that transmits requests to linkChecker.com, at line 5040, to evaluate the desirability of hyperlinks found in the DOM. A block 5050 defines an onreadystatechange event handler of the XMLHttpRequest object. The event handler is designed to execute a callback function in response to changes in the request's state. The block 5050 checks the request's status and processes the response when it is received. Specifically, if the server response (i.e., the response from linkChecker.com) indicates that a hyperlink is an "UNDESIRABLE LINK," a flag icon is dynamically added next to the hyperlink on the page, setting up a data attribute with the reason for the flagging, which will be displayed on hover. The reason for the flagging is extracted from the response (e.g., from the response.reason attribute).

FIG. 6 illustrates an example 6000 of the operations of the code execution checker 4020 of FIG. 4. The example 6000 illustrates JavaScript code that may be injected, such as by the proxy 3030, into a main page, as described above. The example 6000 is a mere simplified, illustrative example and the disclosure herein is not limited to or by the example 6000. The JavaScript of the example 6000 intercepts fetch( ) and eval( ) and performs heuristic checks with respect to parameters (e.g., inputs) thereto to determine whether executions thereof are considered safe. If executions are considered safe (e.g., pass heuristic checks), then the calls can proceed.

Lines 6010 are used to create references to the original (e.g., JavaScript built-in) fetch( ) and eval( ) functions provided by the browser's window object. By saving these references in constants (originalFetch and originalEval), the script of the example 6000 can later call the original functions.

A block 6020 redefines (e.g., overwrites) the window.fetch( ) function. The redefined function includes a desirability (e.g., security) check (e.g., heuristic checks) before making a network request. When fetch( ) is called, such as from another non-injected JavaScript code, the redefined function first checks if the requested resource is considered safe by the isSafeForFetch( ) function, which may perform one or more heuristic checks (not shown). If the resource passes the check(s), the function proceeds with the original fetch( ) call using the saved originalFetch function. If the resource fails the check, an error message is logged to the console and a rejected Promise is returned, effectively blocking the network request. A Promise in JavaScript is an object representing the eventual completion (or failure) of an asynchronous operation. In this case, by rejecting the Promise, the function indicates that the asynchronous operation has failed.

A block 6030 redefines (e.g., overwrites) the window.eval( ) function. The redefined function first checks if the input code is considered safe by the isSafeForEval( ) function, which may implement one or more heuristic evaluations (e.g., rules) to determine the safety of the input code. If the code is safe, the redefined eval( ) function executes the code using the original eval( ) function saved in originalEval. If the code is not safe, an error message is logged indicating that the eval( ) usage was blocked due to security concerns, and then an error is error is thrown with the message "Blocked by security policy." As such, execution of potentially harmful code is prevented.

To illustrate using a simple example, and without limitations, suppose that the webpage included the following execution of eval: eval ('document.cookie'), which is an attempt at accessing and potentially leaking cookie information, which could include sensitive session tokens. A heuristic check may inspect the content of the code string passed to eval( ) If the string "document.cookie" is explicitly detected, then the function isSafeForEval determines the code to be unsafe for execution.

In an example, at least one of the isSafeForEval( ) or isSafeForFetch( ) may transmit a request to another device that can perform one or more of the heuristic analyses on their respective inputs. In an example, the link checker 3040 of FIG. 3 may be further configured to perform heuristic analyses with respect to inputs to built-in functions.

FIG. 7 illustrates an example 7000 of the operations of the DOM monitor 4040 of FIG. 4. The example 7000 illustrates JavaScript code that may be injected, such as by the proxy 3030, into a main page, as described above. The example 7000 is a mere simplified, illustrative example and the disclosure herein is not limited to or by the example 7000. The example 7000 configures a MutationObserver for monitoring changes to the DOM of a webpage. The MutationObserver is a JavaScript API that provides the ability to watch for changes to the DOM of a web page.

In a block 7010, a MutationObserver is created and assigned to the constant observer. The callback is configured to execute a callback function whenever DOM mutations (changes) occur that match specified criteria (configuration). The callback function of the observer processes an array of mutations, where each mutation represents a set of changes. For each mutation in the array, the callback checks if any nodes were added (mutation.addedNodes.length). If there are added nodes, it iterates through each node (mutation.addedNodes.forEach). Within this iteration, the callback checks if the node is an element node (node.nodeType===Node.ELEMENT_NODE) and specifically if it is an anchor (<a>) element (node.tagName==='A'). If both conditions are met, indicating that a new anchor tag has been added to the DOM, the function evaluateLink (node), which is described above with respect to FIG. 5, is called with the newly added anchor tag as its argument.

At a line 7020, a configuration is defined for the observer. The configuration identifies the types of mutations that the observer is configured react to. In this example, the observer is to be configured to react to childList and subtree mutations. The "childList: true" configures the observer to monitor for direct children changes of the observed node (such as additions or removals of children). The "subtree: true" extends this monitoring to the entire subtree of the observed node, meaning all descendants, not just direct children. At a line 7030, the observer begins monitoring mutations by calling observer.observe (document.body, config). Here, document.body is specified as the target node for the observer, meaning the entire body of the document is under surveillance for changes matching the specified configuration.

Figure 9:
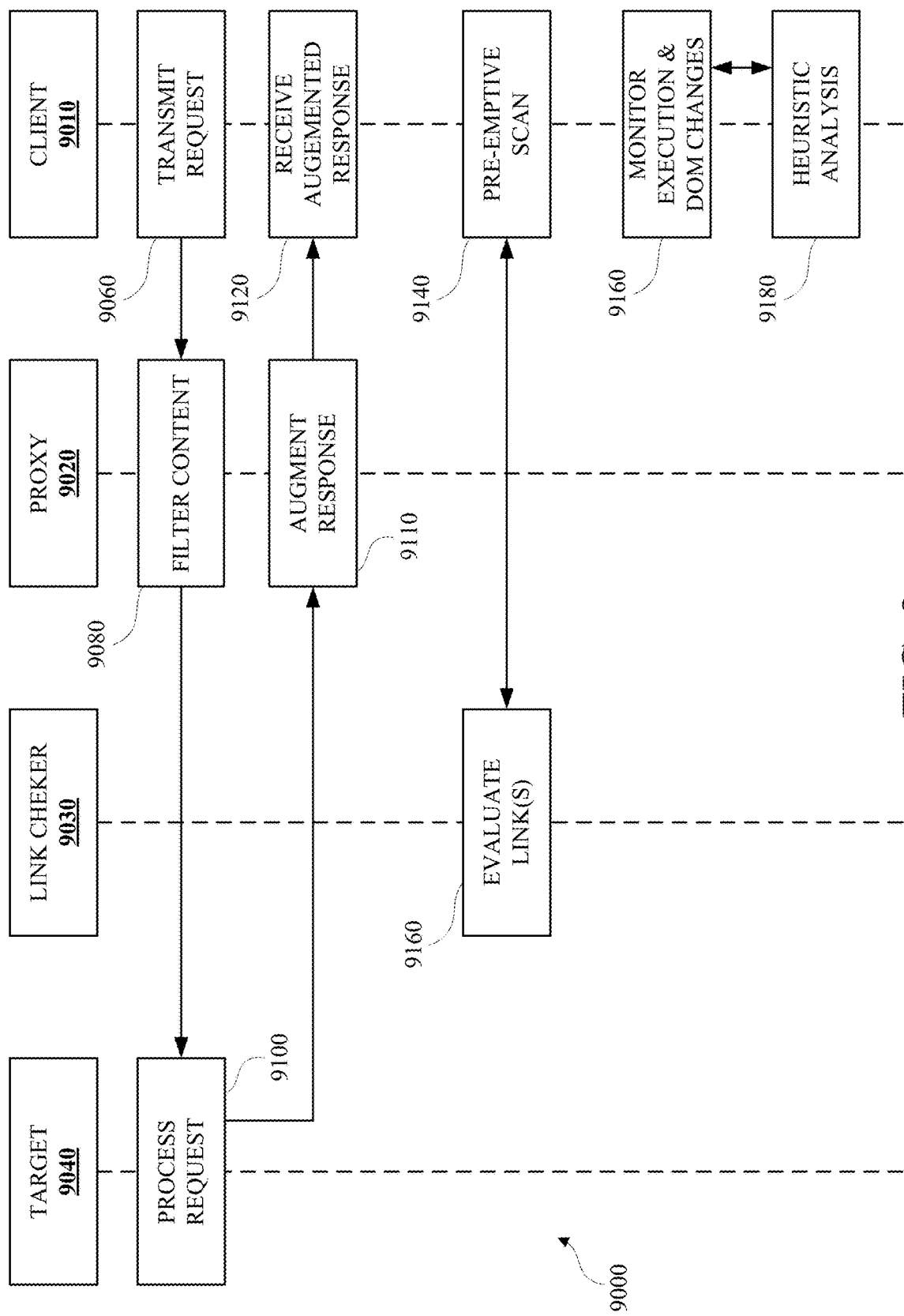
FIG. 9 is an example of an interaction diagram for browser-side execution detection and prevention.

FIG. 9 is an example of an interaction diagram 9000 for browser-side execution detection and prevention. The interaction diagram 9000 includes a client 9010, a proxy 9020, a link checker 9030, and a target 9040, which can be, respectively, the client 3010, the proxy 3030, the link checker 3040, and the target 3020 of FIG. 3. The proxy 9020 can be a transparent proxy. In an example, the transparent proxy can be implemented at the client 9010. That is, the proxy 9020 can be deployed at and is executed by the same computing device as the client 9010. In another example, the client 9010 and the proxy 9020 can be implemented at different computing devices.

At 9060, the client 9010 transmits a request to the target 9040. For example, the client 9010 (e.g., a web browser therein) may initiate a request to load a web page from the target 9040. In an example, the web page may be a web-based email client webpage. At 9080, the proxy 9020 may intercept the request and may filter the content of the request based on predetermined security protocols. In an example, the proxy 9020 may determine that the request is intended to be handled by the proxy 9020 itself even though it is directed to the target 9040. To illustrate, the request may include a string (e.g., a unique function name or some other string) that the proxy 9020 is configured to interpret that the request is to be handled by the proxy 9020.

If the request is transmitted to the target 9040, then the target 9040, receives and processes the request and transmits a response back to the requester (in this case, the proxy 9020). At 9110, the proxy 9020 receives the response and augments the response by injecting security components such as a client guard engine, which can be the client guard engine 3060 of FIG. 3 or the client guard engine 4000 of FIG. 4, before passing the augmented response to the client 9010 which is received by the client 9010 at 9120. As mentioned above, prior to injecting the client guard engine, the proxy 9020 determines whether the response is to be augmented with the client guard engine. For example, the proxy 9020 injects the client guard engine in response to determining that the response constitutes a main page.

As described above, the client guard engine may load and create JavaScript functions that override JavaScript functions to be monitored and enables (e.g., configures) DOM listeners. As described above, the execution of JavaScript functions not originating from the client guard engine will pass through a heuristics engine, which will allow or block the execution. The heuristic engine implements or includes a set of rules that are evaluated against an input.

At 9140, the client guard engine performs a pre-emptive scan. The preemptive scan can be as described above. As such, the client 9010 may transmit one or more link evaluation requests to the link checker 9030 with respect to hyperlinks that the client guard engine identifies in the DOM of the web page. At 9160, the link checker 9030 evaluates the hyperlinks and returns to the client 9010 data indicating which of the hyperlinks are undesirable. The link checker 9030 may evaluate the hyperlinks against a database of known undesirable (e.g., malicious) links. In an example, the client 9010 may transmit one request that includes all of the hyperlinks identified in DOM and the link checker 9030 may transmit back at least information with respect to those hyperlinks identified as undesirable. As described above, the client 9010 (e.g., the client guard engine) augments the DOM with informative information about hyperlinks identified as undesirable by the link checker 9030.

Additionally, at 9160, the client guard engine monitors execution of at least certain code (e.g., JavaScript functions) and monitors changes in the DOM. As part of the monitoring, the client guard engine may apply heuristic analysis, at 9180, to detected dynamic content or script execution to identify potential security threats. As also described above, the client guard engine may perform ad-blocking or cryto mining detection.

Figure 10:
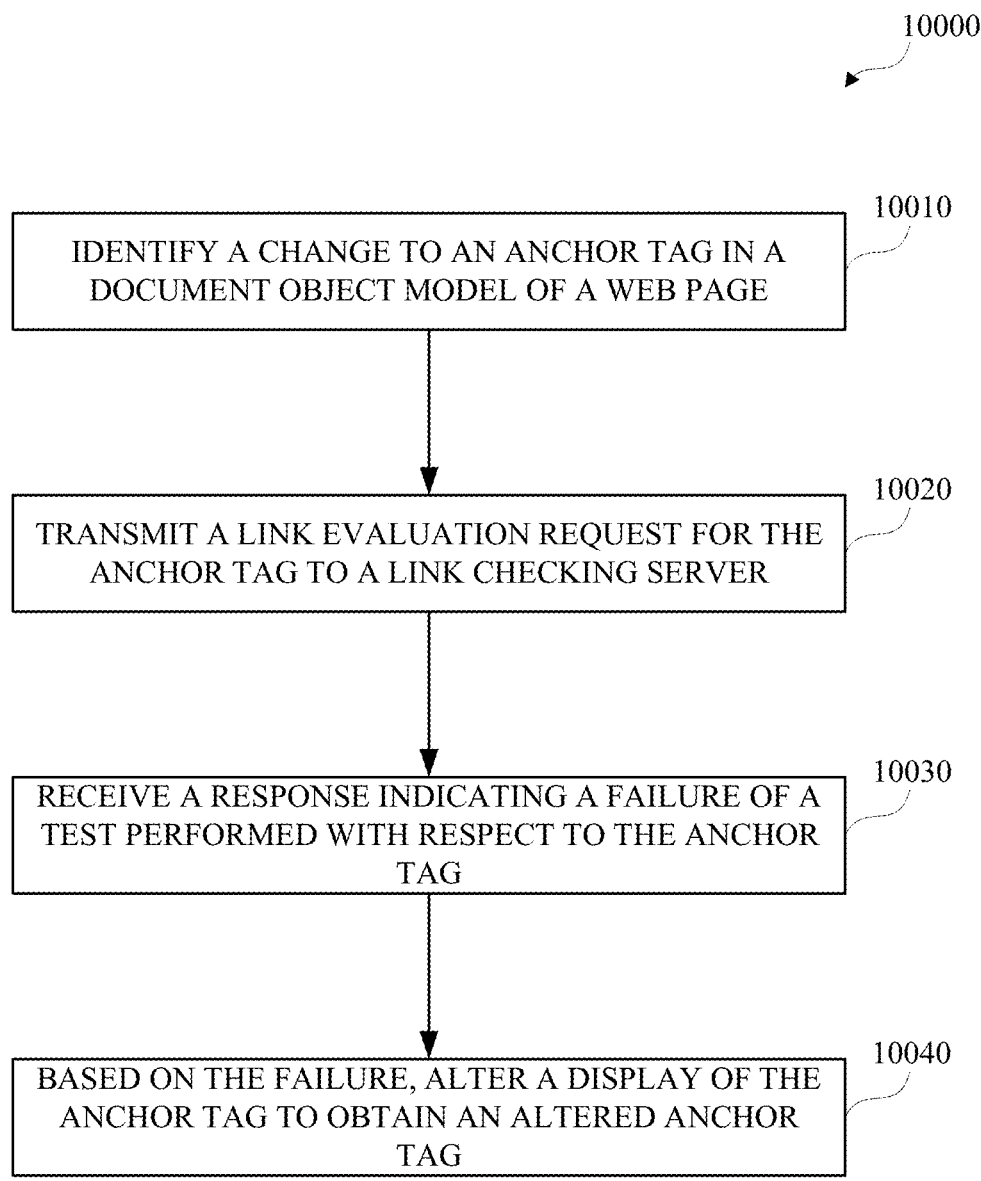
FIG. 10 is a flowchart of an example of a technique for determining whether hyperlinks on a web page, if clicked, would result in undesirable effects.

To further describe some implementations in greater detail, reference is next made to examples of techniques which may be performed by or using a system for browser-side execution detection and prevention. FIG. 10 is a flowchart of an example of a technique 10000 for determining whether hyperlinks on a web page, if clicked, would result in undesirable effects. The technique 10000 can be executed using computing devices, such as the systems, hardware, and software described with respect to FIGS. 1-8C. The technique 10000 can be performed, for example, by executing a machine-readable program or other computer-executable instructions, such as routines, instructions, programs, or other code. The steps, or operations, of the technique 10000, or another technique, method, process, or algorithm described in connection with the implementations disclosed herein can be implemented directly in hardware, firmware, software executed by hardware, circuitry, or a combination thereof. The technique 10000 can be implemented by a client (e.g., a client device), such as the client 3010 of FIG. 3 or the client 9010 of FIG. 9. The technique 10000 can be implemented by a client guard engine, such as the client guard engine 3060 of FIG. 3 or the client guard engine 4000 of FIG. 4.

For simplicity of explanation, the technique 10000 is depicted and described herein as a series of steps or operations. However, the steps or operations of the technique 10000 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 10010, the client device identifies a change to (e.g., an addition of or a change to) an anchor tag in a document object model of a web page. For example, the change can be a change to the href attribute of the anchor tag. For example, the change can be the addition of a new anchor tag to the DOM. The addition of or change to the anchor tag can be identified as described with respect to the client guard engine. The addition or the change to the anchor tag can be identified as described herein. For example, the addition or the change can be identified by the link checker 4010 or the DOM monitor 4040 of FIG. 4.

At 10020, in response to identifying the addition or the change to the anchor tag, the client device transmits a link evaluation request for the anchor tag. The link evaluation request is transmitted to a link checking server. The link checking server can be a server that implements a link checker, such as the link checker 3040 of FIG. 3 or the link checker 9030 of FIG. 9. The link checker receives the link evaluation request. The link evaluation request can include characteristics of the anchor tag. For example, the link evaluation request can include the value of the hypertext reference (href) attribute of the anchor tag.

At 10030, the client device receives from the link checking server a response indicating a failure of at least one test performed by the link checking server with respect to the anchor tag. As alluded to above, different levels of failures (e.g., levels of undesirability) may be identified by the link checking server. The link checking server may perform one or more tests with respect to the anchor tag. As mentioned, the link checking server may determine whether the hyperlink reference is included in a database, may determine whether the hyperlink reference matches a pattern, or may determine whether the hyperlink reference matches or more heuristics. A failure of at least one test performed by the link checking server means that the link checking server identified a level of undesirability with respect to the anchor tag. The failure corresponds to a communication from the link checking server indicating to the client that at least a warning is to be presented to the user of the client device with respect to the anchor tag.

At 10040, in response to (e.g., based on or following) the response indicating the failure, the client alters a display of the anchor tag to obtain an altered anchor tag in the web page. The altered anchor tag can include a visual indicator of the failure. Altering the display of the anchor tag may include disabling the anchor tag. The visual indicator can include an icon (e.g., a reference to an icon) representative of a type of threat associated with the anchor tag. The visual indicator can be a color change of a text of the anchor tag. In an example, a navigation action may be prevented when the anchor tag is activated, such as in response to an input that activates the anchor tag. For example, a warning may be displayed when the user activates (e.g., clicks on) the hyperlink, and the user is not navigated to the hyperlink reference of the anchor tag. In an example, the hyperlink functionality of the anchor tag may be disabled so that it is clickable by the user. In an example, the hyperlink reference of the anchor tag can be modified to redirect to a warning page that includes a description of a potential risk associated with the failure. The technique 10000 may include displaying a tooltip when hovering over the altered anchor tag. For example, in response to detecting a hover by a pointer device, such as a mouse, over the altered anchor tag, the tooltip can be displayed. The tooltip can provide details on the failure (e.g., the undesirability of the anchor tag).

In some implementations, the technique 10000 may include implementing an override function of a built-in function by replacing the built-in function with a custom implementation of the built-in function. The override function may intercept an invocation of the built-in function. The override function may be configured to subject an input of the built-in function to a security check to determine whether to execute the built-in function based on the invocation.

In some implementations, the technique 10000 may include employing, by the client device, a heuristic engine to analyze script behavior related to an undesirable anchor tag and blocking any associated scripts that exhibit malicious characteristics.

The built-in function can be a function that retrieves resources asynchronously, such as across a network, from an input destination. In an example, the built-in function can be the fetch( ) function. The security check can include validating the input destination of the built-in function against a list of secure resources. In an example, the validation can be performed by at the client, at a proxy server, via the proxy server by another server, or by the other server.

The built-in function can be a function that evaluates and executes an input string. In an example, the built-in function can be the eval( ) function. As such, subjecting the input to the built-in function to the security check can include performing a heuristic analysis of the input string to identify a pattern indicative of a code injection attack; and blocking execution of the built-in function with respect to the input string based on detecting the code injection attack. That is, for example, if the string is determined to match an XSS pattern, then execution of the string (e.g., evaluation of the string as if it were executable code) is blocked in response to detecting (e.g., determining) that the string likely constitutes a code injection attack.

Unless expressly stated, or otherwise clear from context, the terminology "computer," and variations or wordforms thereof, such as "computing device," "computing machine," "computing and communications device," and "computing unit," indicates a "computing device," such as the computing device 1000 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   identifying, by a client device, a real-time change to an anchor tag in a dynamically updated document object model of a web page, wherein the real-time change is detected during an active session in which the web page is displayed;
   in response to identifying the real-time change to the anchor tag, transmitting, by the client device to a link checking server, a link evaluation request for the anchor tag;
   receiving, by the client device and from the link checking server, a response indicating a failure of at least one test performed by the link checking server with respect to the anchor tag; and
   in response to the response indicating the failure, altering, to obtain an altered anchor tag, a visual appearance of the anchor tag to visually signify the failure.

2. The method of claim 1, further comprising:
   preventing, by the client device, a navigation action based on an input activating the altered anchor tag.

3. The method of claim 1, wherein altering the visual appearance of the anchor tag comprises:
   disabling, by the client device, a hyperlink functionality of the anchor tag.

4. The method of claim 1, further comprising:
   displaying, by the client device, a tooltip based on a hover over the altered anchor tag, the tooltip including details on the failure received from the link checking server.

5. The method of claim 1, wherein the altered anchor tag includes a color change of a text of the anchor tag.

6. The method of claim 1, wherein altering the visual appearance of the anchor tag comprises:
   modifying a hyperlink reference of the anchor tag to redirect to a warning page that includes a description of a potential risk associated with the failure.

7. The method of claim 1, wherein the altered anchor tag includes a reference to an icon representative of a type of threat associated with the anchor tag.

8. The method of claim 1, further comprising:
   implementing, by the client device, an override function of a built-in function by replacing the built-in function with a custom implementation of the built-in function;
   intercepting by the override function an invocation of the built-in function; and
   subjecting, by the client device, an input to the built-in function to a security check to determine whether to execute the built-in function based on the invocation.

9. The method of claim 8, wherein the built-in function, when executed, retrieves resources asynchronously from an input destination, and wherein the security check comprises validating the input destination.

10. The method of claim 8,
    wherein the built-in function evaluates and executes and input string, and
    wherein subjecting the input to the built-in function to the security check comprises:
      performing an analysis of the input string to identify a pattern indicative of a code injection attack; and
      blocking execution of the built-in function with respect to the input string based on detecting the code injection attack.

11. A device, comprising:
    a memory; and
    a processor, the processor configured to execute instructions stored in the memory to:
      identify a real-time change to an anchor tag in a dynamically updated document object model of a web page, wherein the real-time change is detected during an active session in which the web page is displayed;
      in response to identifying the real-time change to the anchor tag, transmit, to a link checking server, a link evaluation request for the anchor tag;
      receive, from the link checking server, a response indicating a failure of at least one test performed by the link checking server with respect to the anchor tag; and
      in response to the response indicating the failure, alter, to obtain an altered anchor tag, a visual appearance of the anchor tag to visually signify the failure.

12. The device of claim 11, wherein the processor is further configured to execute instructions stored in the memory to:
    display a tooltip based on a hover over the altered anchor tag, the tooltip including details on the failure received from the link checking server.

13. The device of claim 11, wherein the altered anchor tag includes a visual indicator representative of a type of threat associated with the anchor tag.

14. The device of claim 11, wherein the processor is further configured to execute instructions stored in the memory to:
    implement an override function of a built-in function by replacing the built-in function with a custom implementation of the built-in function;
    intercept by the override function an invocation of the built-in function; and subject an input to the built-in function to a security check to determine whether to execute the built-in function based on the invocation.

15. The device of claim 14, wherein the built-in function, when executed, retrieves resources asynchronously from an input destination, and wherein the security check comprises validating the input destination.

16. The device of claim 14,
wherein the built-in function evaluates and executes an input string, and
wherein to subject the input to the built-in function to the security check comprises to:
perform a heuristic analysis of the input string to identify a pattern indicative of a code injection attack; and
block execution of the built-in function with respect to the input string based on detecting the code injection attack.

17. A non-transitory computer-readable storage medium, comprising executable instructions that, when executed by a processor, facilitate performance of operations comprising:
identifying, by a client device, a real-time change to an anchor tag in a dynamically updated document object model of a web page, wherein the real-time change is detected during an active session in which the web page is displayed;
in response to identifying the real-time change to the anchor tag, transmitting, by the client device to a link checking server, a link evaluation request for the anchor tag;
receiving, by the client device and from the link checking server, a response indicating a failure of at least one test performed by the link checking server with respect to the anchor tag; and
in response to the response indicating the failure, altering, to obtain an altered anchor tag, a visual appearance of the anchor tag to visually signify the failure.

18. The non-transitory computer-readable storage medium of claim 17, wherein the operations further comprise:
implementing an override function of a built-in function by replacing the built-in function with a custom implementation of the built-in function;
intercepting by the override function an invocation of the built-in function; and
subjecting an input to the built-in function to a security check before to determine whether to execute the built-in function based on the invocation.

19. The non-transitory computer-readable storage medium of claim 18, wherein the built-in function is a first built-in function or a second built-in function,
wherein the first built-in function, when executed, retrieves resources asynchronously across a network from an input destination, and the security check comprises validating the input destination, and
wherein the second built-in function, when executed, evaluates and executes an input string, and subjecting the input to the built-in function to the security check comprises:
performing a heuristic analysis of the input string to identify a pattern indicative of a code injection attack; and
blocking execution of the built-in function with respect to the input string based on detecting the code injection attack.

20. The non-transitory computer-readable storage medium of claim 17, wherein the altered anchor tag includes a reference to an icon representative of a type of threat associated with the anchor tag.

* * * * *